United States Patent
Johnson et al.

(10) Patent No.: US 6,465,105 B1
(45) Date of Patent: Oct. 15, 2002

(54) WDM OPTICAL FILTER AND GLASS SUBSTRATE FOR USE IN THE WDM OPTICAL FILTER

(75) Inventors: Robert W. Johnson, Oakland, CA (US); Hiroaki Yanagita, Tokyo (JP); Kazuaki Hashimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/630,775

(22) Filed: Aug. 2, 2000

Related U.S. Application Data

(60) Provisional application No. 60/146,355, filed on Aug. 2, 1999.

(51) Int. Cl.$^7$ .............................................. B32B 17/06
(52) U.S. Cl. ........................ 428/426; 501/72; 501/134
(58) Field of Search .............................. 501/55, 68, 72, 501/134, 153; 359/589; 428/426

(56) References Cited

U.S. PATENT DOCUMENTS

| | | | |
|---|---|---|---|
| 3,240,660 A | | 3/1966 | Babcock et al. |
| 3,383,225 A | | 5/1968 | Stradley |
| 4,769,347 A | | 9/1988 | Cook et al. |
| 5,320,987 A | | 6/1994 | Senoo et al. |
| 5,504,608 A | * | 4/1996 | Neeves et al. ............... 359/124 |
| 6,157,025 A | * | 12/2000 | Katagiri et al. ............. 250/226 |

FOREIGN PATENT DOCUMENTS

| | | |
|---|---|---|
| EP | 002178160 | 7/1993 |
| EP | 0 645 348 | 3/1995 |
| EP | 0 859 251 | 2/1998 |
| JP | 52-25812 A | 2/1977 |
| JP | 62-087432 | 4/1987 |
| JP | 62-160403 | 7/1987 |
| JP | 05-058671 | 3/1993 |
| JP | 06-115969 A | 4/1994 |
| JP | 07-198935 | 1/1995 |
| JP | 09-208250 | 8/1997 |
| JP | 10-078528 A | 3/1998 |
| JP | 10-339825 | 12/1998 |
| JP | 10-512975 | 12/1998 |
| JP | 11-305035 A | 11/1999 |
| JP | 2001-066425 A | 3/2001 |
| WO | WO98/55993 | 10/1998 |

OTHER PUBLICATIONS

Temperature stability of thin–film narrow–bandpass filters produced by ion–assisted deposition (Haruo Takahashi, Applied Optics, vol. 34, No. 4, 667–675 (1995)) No Month.
Catalog of Optical Glass by Ohara Inc. No Date.
Glass Formation and Properties of Glasses in the System $Na_2O–B_2O_3–SiO_2–TiO_2$ (J. H. Strimple et al, Journal of the American Ceramic Society, vol. 41. No. 7, 231–238) No Date.
Effects of Titanium Dioxide in Glass (J. H. Strimple, The Glass Industry, 679–694, Dec. 1963).
Glass Composition Data Book 1991, pp. 1–10 No Month.
Temperature stability of thin–film narrow–bandpass filters produced by ion–assisted deposition Feb. 1, 1995, vol. 34, No. 4 Applied Optics.

* cited by examiner

*Primary Examiner*—Deborah Jones
*Assistant Examiner*—Gwendolyn Blackwell-Rudasill
(74) *Attorney, Agent, or Firm*—Sughrue Mion, PLLC

(57) ABSTRACT

A glass substrate is for use in a WDM optical filter which has an optical multilayer coated on the glass substrate and is formed by glass which has a composition related to the optical multilayer so as to assure stable multiplexing/demultiplexing operation in the optical filter. The glass includes $SiO_2$ as a glass network-former and has an average linear thermal expansion coefficient between $100 \times 10^{-7}/K$ and $130 \times 10^{-7}/K$ within a temperature range between $-30°$ C. and $+70°$ C. The glass may include $TiO_2$, $Al_2O_3$, and $R_2O$ (R: alkali metal element) in addition to $SiO_2$ and may have a hardness suitable for the optical multilayer.

153 Claims, 4 Drawing Sheets

WDM OPTICAL FILTER AND GLASS SUBSTRATE FOR USE IN THE WDM OPTICAL FILTER

This application claims the benefit of provisional application No. 60/146,355 filed on Aug. 2, 1999.

BACKGROUND OF THE INVENTION

This invention relates to an optical filter used in a field of optical communication to select a light beam of a specific wavelength from multiple wavelength light components. This invention also relates to a glass substrate for the above-mentioned optical filter. In particular, this invention relates to a WDM (wavelength division multiplexing) optical filter. This invention also relates to a glass substrate for use in such optical filter.

In such WDM (wavelength division multiplexing) communication, communication is carried out by combining light beams having wavelengths slightly different from one another into a combined light beam and, inversely, by splitting or demultiplexing the combined light beam to selectively derive a specific wavelength light beam from the combined light beam. Herein, it is to be noted that the optical filter used for light combination and separation has been called a WDM (Wavelength Division Multiplexing) optical filter. As such a WDM optical filter, there are known WDM optical filters described in JP-A H10-339825 and JP-A H10-512975.

Each of the optical filters described in these publications comprises a glass substrate with a dielectric multilayer film of $SiO_2$, $TiO_2$, $Ta_2O_5$, or the like formed thereon. Such a dielectric multilayer film is operable as a band-pass filter (BPF) by giving a function which transmits a particular wavelength light beam or which reflects the particular wavelength light beam. As a rule, the substrate on which the dielectric multilayer film is deposited is formed by a glass material, such as silica.

In the meanwhile, it is recently reported that, in the optical filter of the type, a center wavelength in a pass band is drifted due to variation in temperature. It is also reported that such temperature drift depends upon a thermal expansion coefficient of each of the glass substrate and the dielectric multilayer film (Haruo Takahashi, Applied Optics, Vol. 34[4], pp. 667–675, 1995).

In the above-referenced article, description is made about the fact that a center wavelength within the pass band is drifted or shifted towards a positive direction (namely, a longer wavelength direction) when the thermal expansion coefficient of the glass substrate is smaller than a range determined for thermal properties of the dielectric multilayer such as an expansion coefficient. On the other hand, in case where the thermal expansion coefficient of the glass substrate is excessively large, the drift of the filter center wavelength occurs in a negative direction (shorter-wavelength direction).

If the drift is undesirably large, a filter characteristic, i.e., a transmission wavelength unfavorably varies following the change in operation temperature. In particular, if the bandpass filter is used as a narrow band filter, for example, in an optical multiplexer/demultiplexer used in a wavelength multiplexing transmission technique of optical communication, the influence becomes serious because such a narrow band constraint inevitably restricts a transmission density. Following an increase in a degree of wavelength multiplexing, there arises an increasing demand for an optical filter having a more stable characteristic over the variation in temperature as well as an optical multiplexer/demultiplexer using the same. In order to increase a thermal stability, proposal is made of a technique of controlling the temperature of the optical filter. However, this technique requires a complicated structure. Therefore, the difficulty in assuring a long-term reliability is increased and devices and apparatuses become more expensive.

As described above, the temperature drift of the bandpass peak wavelength constitutes one of factors that obstructs a high density optical communication.

In addition, conventional optical filters are disadvantageous in that peeling off of the multilayer from the glass substrate is liable to occur due to a temperature variation.

SUMMARY OF THE INVENTION

Taking the above-mentioned background into consideration, this invention has been created so as to reduce a temperature drift at a center wavelength of a pass band and to thereby avoid peeling off of the dielectric multilayer. More specifically, it is an object of this invention to provide a novel glass substrate which has a desired thermal expansion coefficient and a desired composition. It is another object of this invention to provide an optical filter and an optical multiplexer/demultiplexer both of which has a high reliability and which can reduce a temperature drift at a center wavelength within a pass band.

It is another object of this invention to provide a method of manufacturing glass which has a thermal expansion coefficient pertinent to a substrate material for a wavelength multiplexing/demultiplexing optical filter. Such glass can be obtained by controlling an amount of specific glass components.

According to a first aspect of this invention, a glass substrate is for use in a wavelength multiplexing/demultiplexing optical filter and is formed by glass which includes $SiO_2$ and which has a thermal expansion coefficient between $100 \times 10^{-7}$ and $130 \times 10^{-7}$/K within a temperature range between $-30$ and $+70°$ C.

According to a second aspect of this invention, a glass substrate is used for an wavelength multiplexing/demultiplexing optical filter and is formed by glass which includes $SiO_2$, $R_2O$ (wherein R is representative of an alkali metal element), and $TiO_2$ as essential components and which comprises a total of the essential components not smaller than 60 mol %.

According to a third aspect of this invention, a glass substrate for the wavelength multiplexing/demultiplexing optical filter and is formed by glass which includes $SiO_2$, $R_2O$ (wherein R is representative of an alkali metal element), and $TiO_2$ as essential components a total amount of which is greater than an amount of each of the remaining components.

According to a fourth aspect of this invention, the glass mentioned in connection with each of the first through the third aspects comprises, by mol %,

| | |
|---|---|
| $SiO_2$ | 38–58% |
| $TiO_2$ | 7–30% |
| $Al_2O_3$ | 0–12% and |
| $R_2O$ | 15–40% in total. |

According to a fifth aspect of this invention, the glass mentioned in connection with the fourth aspect comprises, by mol %, as $R_2O$,

| | |
|---|---|
| Na$_2$O | 10–25% and |
| K$_2$O | 4–15%. |

According to a sixth aspect of this invention, the glass mentioned in connection with each of the second and the third aspects of this invention comprises, by mol %,

| | |
|---|---|
| SiO$_2$ | 38–55% |
| Na$_2$O | 13–25% |
| K$_2$O | 2–15% |
| TiO$_2$ | 10–25% |
| Al$_2$O$_3$ | 0.5–8%. |

According to a seventh aspect of this invention, the glass mentioned in conjunction with each of the second through the sixth aspects comprises at least one species of oxides RO selected from a group consisting of alkaline earth metal oxides and zinc oxide.

According to an eighth aspect of this invention, the glass mentioned in the seventh aspect comprises, by mol %, a total of RO between 2 and 15%.

According to a ninth aspect of this invention, the glass mentioned in each of the seventh and the eighth aspects comprises, as RO, by mol %

| | |
|---|---|
| MgO | 0–13% |
| CaO | 0–10% |
| SrO | 0–8% |
| BaO | 0–6%, and |
| ZnO | 0–10%. |

According to a tenth aspect of this invention, the glass mentioned in each of the seventh through the ninth aspects comprises, by mol %,

| | |
|---|---|
| MgO | 1–13% |
| ZnO | 0.5–10%, and |
| Sb$_2$O$_3$ | 0–1%. |

According to an eleventh aspect of this invention, the glass mentioned in each of the second through the tenth aspects comprises, by mol %,

| | |
|---|---|
| ZrO$_2$ | 0–2% |
| HfO$_2$ | 0–2% |
| La$_2$O$_3$ | 0–2%, and |
| Y$_2$O$_3$ | 0–2%. |

According to a twelfth aspect of this invention, the glass mentioned in each of the second through the eleventh aspects has an average thermal expansion coefficient between $100\times10^{-7}$ and $130\times10^{-7}$ at a temperature range between −30 and +70° C.

According to a thirteenth aspect of this invention, the glass mentioned in the twelfth aspect has an average thermal expansion coefficient between $105\times10^{-7}$ and $120\times10^{-7}$ at a temperature range between −30 and +70° C.

According to a fourteenth aspect of this invention, the glass mentioned in each of the first through the thirteenth aspects has a Knoop hardness not smaller than 455 MPa.

According to a fifteenth aspect of this invention, a wavelength multiplexing/demultiplexing optical filter has a glass substrate mentioned in conjunction with each of the first through the fourteenth aspects and an optical multilayer deposited on the substrate.

According to a sixteenth aspect of this invention, the optical filter has a temperature drift between −0.0025 nm/K and +0.0025 nm/K at a center wavelength of a pass band.

According to a seventeenth aspect of this invention, a wavelength multiplexing/demultiplexing optical unit has the optical filter mentioned in each of the fifteenth and the sixteenth aspects.

According to an eighteenth aspect of this invention, a method is for manufacturing glass used in a glass substrate of an optical filter. The optical filter has an optical multilayer which is fixedly deposited on the glass substrate and which has a band pass filter function. The method comprises the step of obtaining the glass which has an average thermal expansion coefficient between $100\times10^{-7}$ and $130\times10^{-7}$ at a temperature range between −30 and +70° C., by controlling an amount of TiO$_2$ and alkali metal oxide RO as a glass component.

According to a nineteenth aspect of this invention, the method mentioned in the eighteenth aspect adjusts the amount of TiO$_2$ and RO in consideration of a usable temperature range of the optical filter, so that a temperature drift at the center wavelength within the pass band of the optical multilayer becomes minimum in the usable temperature range.

Description will be made about this invention more in detail.

A glass substrate is used to manufacture an optical filter by successively stacking, on a glass substrate surface, a high refractive index dielectric film and a low refractive index dielectric film and by forming an optical multilayer which has a band pass function passing through a specific wavelength of light within incident light beam, by using optical interference.

As mentioned before, it is necessary to reduce a temperature drift at a center wavelength in a pass band on the wavelength multiplexing/demultiplexing. Herein, it is to be noted that the above-mentioned band pass function can be accomplished by using the optical interference in the multilayer. This means that a reduction of a temperature drift needs to decrease fluctuation among optical lengths within the multilayer due to a temperature variation. It is to be considered that the fluctuation among the optical lengths results from a variation of refractive indexes of each film included in the multilayer and a variation of thicknesses of the films.

In addition, consideration must be also made about the fact that the glass substrate is also thermally expanded or shrunk together with the multilayer, namely, an optical multilayer when the optical filter is exposed to a variation of a temperature. As readily understood from the above, since the optical multilayer is fixedly deposited on the glass substrate surface, thermal stress is imposed onto the optical multilayer due to the thermal expansion or shrinkage of the glass substrate when the glass substrate and the multilayer are different from each other in thermal expansion coefficients. This thermal stress brings about a slight variation of the thickness and the refractive index in the optical multilayer.

Herein, it is assumed that the variation of the thickness and the refractive index of the optical multilayer, that might take place due to the thermal stress can be cancelled by the variation of the thickness that might occur due to the thermal expansion and shrinkage of the optical multilayer. In this event, it is possible to reduce the variation of the optical lengths within the optical multilayer.

As will be mentioned hereinafter in detail, a practical optical multilayer according to this invention makes it possible to cancel both the above-mentioned variations and, as a result, to reduce the variation of the optical lengths within the optical multilayer. Specifically, it has been found out according to the inventors' experimental studies that the temperature drift can be reduced by rendering an average linear expansion coefficient of the glass substrate into a range between $100 \times 10^{-7}$ and $130 \times 10^{-7}/K$ (preferably, $105 \times 10^{-7}$ and $120 \times 10^{-7}/K$) within a temperature range between $-30$ and $+70°$ C.

As mentioned before, it may be considered that the stress has to be caused to occur between the glass substrate and a contact surface of the optical multilayer so as to reduce the variation of the optical lengths due to the temperature variation. However, the substrate of glass is softer than the optical multilayer which is operable as the dielectric films. Therefore, the optical multilayer is peeled off from the glass substrate. As a result, it is difficult to obtain a high reliability when the glass substrate is used.

Under the circumstances, the first viewpoint of this invention resides in a glass substrate which comprises $SiO_2$ and which has an average linear thermal expansion coefficient between $100 \times 10^{-7}$ and $130 \times 10^{-7}/K$ (preferably, between $105 \times 10^{-7}$ and $120 \times 10^{-7}/K$) within a temperature range between $-30°$ C. and $+70°$ C. The average linear thermal expansion coefficient set into the above-mentioned range makes it possible to reduce the thermal drift at a center wavelength of a pass band. In addition, inclusion of $SiO_2$ serves to enhance a hardness of the glass and provides a glass substrate which prevents an optical multilayer from being peeled off from the glass substrate.

According to the first viewpoint, $SiO_2$ preferably becomes a glass network-former. Judgement can be made about whether or not $SiO_2$ forms the glass network-former in the following manner. At first, when any other components, such as $B_2O_3$, $P_2O_5$, which are operable as the glass network-formers, are not included in glass, $SiO_2$ may be judged as the glass network-former. On the other hand, when the glass includes any other glass network-formers, such as $B_2O_3$, $P_2O_5$, or the like, $SiO_2$ may be judged as the glass network-former when an amount of $SiO_2$ is sufficiently greater than that of the other glass network-formers and may be, for example, twice the amount of the latter.

Thus, the inclusion of $SiO_2$ as the glass network-former is helpful to further increase the hardness of the glass substrate and to prevent the optical multilayer from being peeled off from the glass substrate due to the temperature variation. Consequently, the problem of the peeling off can be solved. Preferably, the glass substrate has, in terms of the Knoop hardness, a hardness which is not smaller than 455 MPa, preferably greater than 460 MPa, and more preferably greater than 500 MPa.

A second viewpoint of this invention resides in a glass substrate which has an average linear thermal expansion coefficient between $100 \times 10^{-7}$ and $130 \times 10^{-7}/K$, preferably, between $105 \times 10-7$ and $120 \times 10^{-7}/K$ and a composition suitable for obtaining a desirable hardness.

Such a glass substrate can be realized by glass which comprises, as essential components, $SiO_2$, $R_2O$ (R: alkali metal elements), and $TiO_2$, a total amount of the essential components exceeding 60 mol %. Alternatively, the glass may comprise, as the essential components, $SiO_2$, $R_2O$ (R: alkali metal elements), and $TiO_2$ and a total amount of the essential components may exceed each amount of the remaining components other than the essential components. The amount of $R_2O$ is indicative of a total amount of the alkali metal oxides.

Hereinafter, the above-mentioned glass will be referred to as $SiO_2$—$R_2O$—$TiO_2$ system glass. The glass substrate may have a Knoop hardness which is not smaller than 455 MPa, preferably, 460 MPa, and more preferably, 500 MPa, as mentioned in conjunction with the first viewpoint.

In the $SiO_2$—$R_2O$—$TiO_2$ system glass, $SiO_2$ serves to harden the glass itself and to improve a weather resistance characteristic of the glass. $R_2O$ is operable to control the average linear thermal expansion coefficient. Specifically, $R_2O$ serves to adjust an average linear thermal expansion coefficient of the $SiO_2$ inclusion glass to a desired average linear thermal expansion coefficient which falls within a predetermined range mentioned above. $TiO_2$ serves to obtain the desired average linear thermal expansion coefficient within the predetermined range and to further excel the weather resistance characteristic.

With the above-mentioned $SiO_2$—$R_2O$—$TiO_2$ system glass, it is possible to accurately match the average linear thermal expansion coefficient within the predetermined range at a temperature between $-30$ and $+70°$ C., in consideration of an optical mulitlayer deposited on the glass substrate. Such matching can be carried out by controlling a degree of substitution between $R_2O$ and $TiO_2$. For example, the degree of substitution between $R_2O$ and $TiO_2$ is adjusted so that the temperature drift becomes minimum (namely, closest to zero) within an avaialbe temperature range (for example, a room temperature). As a result, the average linear thermal expansion coefficient of the glass can be adjusted to a desired value. Herein, the degree of substitution between $R_2O$ and $TiO_2$ can be controlled by measuring each amount of raw materials and by melting the glass.

It is noted here that the $SiO_2$—$R_2O$—$TiO_2$ system glass is transparent for a light beam which has a wavelength band between 1.3 and 1.6 m used for optical communication. This means that the above-mentioned system glass has a high quality as the optical glass.

Next, description will be made about amounts of glass components included in the $SiO_2$—$R_2O$—$TiO_2$ system glass.

As regards $SiO_2$, less than 38 mol % of $SiO_2$ deteriorates the weather resistance characteristic and decrease the hardness of the glass. Consequently, the optical multilayer is liable to be peeled off from the glass substrate. On the other hand, more than 58 mol % of $SiO_2$ makes the average linear thermal expansion coefficient lower than the predetermined range mentioned above and, as a result, undesirably enhances the temperature drift. Taking the above into consideration, the amount of $SiO_2$ falls within a range between 38 and 58 mol %, preferably, between 38 and 50 mol %, and more preferably, between 38 and 48 mol %. The most preferable range of $SiO_2$ is between 42 and 48 mol %.

As regards the alkali metal oxide $R_2O$, when a total amount is less than 15 mol %, it is difficult to obtain the above-mentioned results. On the other hand, more than 40 mol % of $R_2O$ is prone to degrade the weather resistance characteristic of the glass. Thus, the total amount of $R_2O$ may be restricted to a range between 15 and 40 mol %, preferably between 22 and 32 mol %. It is preferable that the alkali metal oxide $R_2O$ may be $Na_2O$ and/or $K_2O$. More preferably, both $Na_2O$ and $K_2O$ may be included in the glass and the alkali metal oxides may desirably consists of only $Na_2O$ and $K_2O$. The amount of $Na_2O$ preferably falls within a range between 10 and 25 mol %, more preferably within a range between 13 and 25 mol %, most preferably, within a range between 15 and 22 mol %. On the other hand, the amount of $K_2O$ preferably falls within a range between 2 and 15 mol %, more preferably between 4 and 15 mol %, and further preferably between 6 and 15 mol %, and most preferably between 6 and 10 mol %.

As regards $TiO_2$, less than 7 mol % of $TiO_2$ degrades the weather resistance characteristic and make it difficult to render the average linear thermal expansion coefficient within the predetermined range. More than 30 mol % of $TiO_2$ makes it difficult to obtain the average linear thermal expansion coefficient falling within the predetermined range. Therefore, the amount of $TiO_2$ falls within a range between 7 and 30 mol %, preferably, between 10 and 25 mol %, further preferably, between 10 and 22 mol %, or between 12 and 22 mol %, and most preferably, between 12 and 20 mol %.

Although $Al_2O_3$ is added as an optional component to the $SiO_2$—$R_2O$—$TiO_2$ system glass, it serves to improve the weather resistance characteristic and to harden the glass. However, more than 12 mol % of $Al_2O_3$ make it difficult to obtain the average linear thermal expansion coefficient within the predetermined range. Under the circumstances, the amount of $Al_2O_3$ is restricted to a range between 0 and 12 mol %, preferably between 0.5 and 12 mol %, ore preferably between 0.5 and 8 mol %, and further preferably between 1 and 8 mol % or between 2 and 8 mol %, and most preferably between 2 and 6 mol %.

As mentioned before, $Al_2O_3$ is added as the optional component to the $SiO_2$—$R_2O$—$TiO_2$ system glass but it serves to improve the weather resistance characteristic like $SiO_2$ and to harden the glass. Accordingly, $Al_2O_3$ may be added as an essential component to the glass. In this event, the glass preferably comprises, by mol %,

| | |
|---|---|
| $SiO_2$ | 38–58% |
| $Na_2O$ | 13–25% |
| $K_2O$ | 2–15%, |
| $TiO_2$ | 10–25%, and |
| $Al_2O_3$ | 0.5–8%. |

In the above-mention glass composition, it is unnecessary to define the total amount of $R_2O$. However, the total amount of $R_2O$ may be restricted to a range between 15 and 40 mol %, preferably between 22 and 32 mol %, like in the above-mentioned composition.

According to the second viewpoint, the glass desirably includes, in addition to the above-enumerated components, at least one oxide selected from a group consisting of alkaline earth metal oxides and zinc oxide. Among others, it is preferable that the glass includes MgO and ZnO. Such alkaline earth metal oxides and zinc oxide improve a devitrification resistance property and a fusion property of the glass. Thus, inclusion of divalent components reduces liquidus temperature and facilitates to manufacture and form the glass. In addition, ZnO is effective to harden the glass and to prevent the optical multilayer from being peeled off. When either the alkaline earth metal oxides or the zinc oxide is included, it is preferable that the total amount of the divalent compoents is not less than 2 mol % so as to realize the above-mentioned effects and is not greater than 15 mol % so as not to degrade the weather resistance characteristic.

In order to realize the excellent devitrification resistance property and to avoid the reduction of the weather resistance characteristic, the glass may comprise, by mol %:

| | |
|---|---|
| ZnO | 0–10%, |
| MgO | 0–13%, |
| CaO | 0–10%, |
| SrO | 0–8%, and |
| BaO | 0–6%. |

More preferably, the glass may comprise, by mol %, 1–13% of MgO and 0.5–10% of ZnO.

The above-mentioned $SiO_2$—$R_2O$—$TiO_2$ system glass may include a refining agent, such as $Sb_2O_3$, an amount of which is desirably restricted to a range between 0 and 0.1 mol %.

In order to improve weather resistance characteristic, the $SiO_2$—$R_2O$—$TiO_2$ may include at least one of oxides selected from a group consisting of $ZrO_2$, $HfO_2$, $La_2O_3$, and $Y_2O_3$. An amount of each component, such as $ZrO_2$, $HfO_2$, $La_2O_3$, and $Y_2O_3$, may be desirably limited to a range between 0 and 1.2 mol % so that the average linear thermal expansion coefficient is not smaller than the predetermined range. The acid resistivity is excellently improved when each of the above-mentioned components is more than 0.2 mol %.

As long as this invention does not depart from its purpose, oxides of, for example, Li, lanthanide, Nb, Ta, W, B, Ga, In, Ge, Sn, Pb, P, Sb, Bi, Te, may be added to an amount of several mol %. Such addition of the oxides is helpful to adjust a refractive index of glass, a glass transition point, and workability. As far as the object of this invention is accomplished, several percents of the oxide components can be replaced by fluoride instead of the oxide components included in the glass.

However, it has been found out according to the inventors experimental studies that most preferable glass composition is specified by a composition of $SiO_2$, $Na_2O$, $K_2O$, $TiO_2$, $Al_2O_3$, MgO, ZnO or by a combination of the above-mentioned composition and $Sb_2O_3$ added to the composition as the refining agent.

The glass substrate according to the first and the second viewpoints has a greater thermal expansion coefficient than that of a typical glass generally used. Therefore, even if a metal material, such as carbon steel (thermal expansion coefficient being about $120\times10^{-7}$/K) and stainless steel (the thermal expansion coefficient being about $110\times10^{-7}$/K), widely used in industry is used as a fixing member, a difference in thermal expansion between the glass substrate and the fixing member is small. Accordingly, optical distortion resulting from stress caused to occur between the glass substrate and the fixing member due to variation in temperature is small. As regards a plastic material, a similar advantage is obtained because, by selecting the degree of polymerization and a bridging agent, use can be made of a material, such as polyethylene, polystyrene, and polymethyl methacrylate, widely used in industry and having a thermal expansion coefficient between 90 and $150\times10^{-7}$/K.

Let an optical apparatus be structured by using an optical unit which has an optical element formed by the $SiO_2$—$R_2O$—$TiO_2$ system glass and which is fixed to a fixing member formed by carbon steel, stainless steel (type 410), polyethylene, polystyrene, and polymethyl methacrylate, as mentioned above. The optical apparatus is small in optical distortion against the thermal variation and is therefore excellent in stability. In addition, the weather resistance is excellent so that use is possible in a wide variety of working environment.

Next, description will be made about the optical filter of this invention.

The optical filter of this invention is used for an optical multiplexer/demultiplexer apparatus for wavelength multiplexing/demultiplexing. The optical filter comprises the above-mentioned glass substrate and an optical multilayer formed on the glass substrate by successively depositing and stacking high refractive index dielectric film or films and low refractive index dielectric film or films. The optical mulitlayer has a band pass function resulting from optical interference and can change a center wavelength within a pass band by varying its structure and a refractive index.

As a material for the high refractive index dielectric film, use is made of $TiO_2$, $Ta_2O_5$, $HfO_2$, $ZrO_2$, $CeO_2$, $Al_2O_3$, $Y_2O_3$, ZnS, MgO, $La_2O_3$, Cds, Si, or the like. As a material for the low refractive index dielectric film, $SiO_2$, $MgF_2$, $ThF_4$ may be used. A preferable material for the high refractive index dielectric film may be $Ta_2O_5$, $TiO_2$ while a preferable material for the low refractive index dielectric film may be $SiO_2$.

The temperature drift of the center wavelength in the optical filter can be reduced by appropriately adjusting the average linear thermal expansion coefficient of a substrate material used. The temperature drift of the center wavelength within the pass band can be suppressed within a range between −0.0025 nm/K and +0.0025 nm/K by using the substrate which has an appropriate average linear thermal expansion coefficient within a range between $100 \times 10^{-7}$ and $130 \times 10^{-7}$/K, although it depends upon the characteristics of the film to be deposited and the depositing conditions. Therefore, the optical filter can be used over a wide temperature range. In addition, the glass substrate material is excellent in weather resistance characteristic and is therefore advantageous in that no problem takes place in connection with a surface degradation which might occur during a polishing process and the like. As a result, the optical filter is available under various working environments.

Herein, it is assumed that wavelength multiplexing/demultiplexing is carried out within a wavelength band of 1.5 µm and that an interval between wavelength components demultiplexed becomes equal to 100 GHz (corresponding to the wavelength interval of 0.8 nm). In addition, it is also assumed that the optical filter has a high transmittance band width of 0.2 nm. Under the circumstances, when the temperature drift exceeds 2.5 pm (0.0025 nm)/K and a temperature is changed over a temperature range of 100 degrees (for example, −30 to +70° C.), a signal optical wavelength is shifted from the high transmittance band width to an untransparent region and can not be demultiplexed. Thus, inconvenience takes place in the optical filter.

In addition, let the interval of the wavelength components multiplexed and demultiplexed be equal to 50 GHz (corresponding to the wavelength interval of 0.4 nm). Inasmuch as the optical filter has a high transmittance band width of about 0.1 nm, the signal optical wavelength probably falls within an untransparent region when the temperature drift exceeds 0.5 pm and a temperature variation of about 100° C. (for example, −30 to +70° C.) is caused to occur in the optical filter. As a result, inconvenience takes place in this case also.

As mentioned before, the optical filter according to this invention has a temperature drift between −0.0025 nm/K and +0.0025 nm/K (preferably, between −0.0005 nm/K and +0.0005 nm/K). Therefore, it is possible to prevent the signal optical wavelength from being located outside of the high transmittance band width within a usual temperature variation range and to accomplish a high reliability.

Since the glass substrate used in the optical filter has a Knoop hardness not smaller than 455 GPa, it is possible to prevent the optical multilayer from being peeled off from the glass substrate due to a difference of linear thermal expansion coefficients between the optical multilayer and the glass substrate, even when the temperature variation exceeds 100° C.

According to this invention, an optical demultiplexer apparatus is obtained which comprises an optical filter, an optical fiber guiding a wavelength multiplexed light beam onto the optical filter through a light exit end of the optical fiber and optical fibers having incident ends to which light wavelength components are given through an optical multilayer of the optical filter.

According to this invention, an optical multiplexer apparatus is obtained which comprises an optical filter having an optical multilayer, a plurality of optical fibers located to the optical filter to conduct wavelength components transmitted or reflected by the optical multilayer, and an optical fiber positioned to conduct the transmitted and the reflected wavelength components and to guide a multiplexed light beam through an incident end of the optical fiber. In consideration of the number of multiplexed wavelengths, a plurality of the optical filters may be used which are different from one anther in center wavelengths of the pass bands and each of which individually carries out multiplexing/demultiplexing operation.

The optical multiplexer apparatus and the optical demultiplxer apparatus (both of which will be often collectively called optical multiplexer/demultiplexer apparatus) have a high reliability even in an environment intensely varied in temperature, because use is made of the optical filter having the high reliability.

DESCRIPTION OF THE PREFERRED EMBODIMENT

Figure 1:
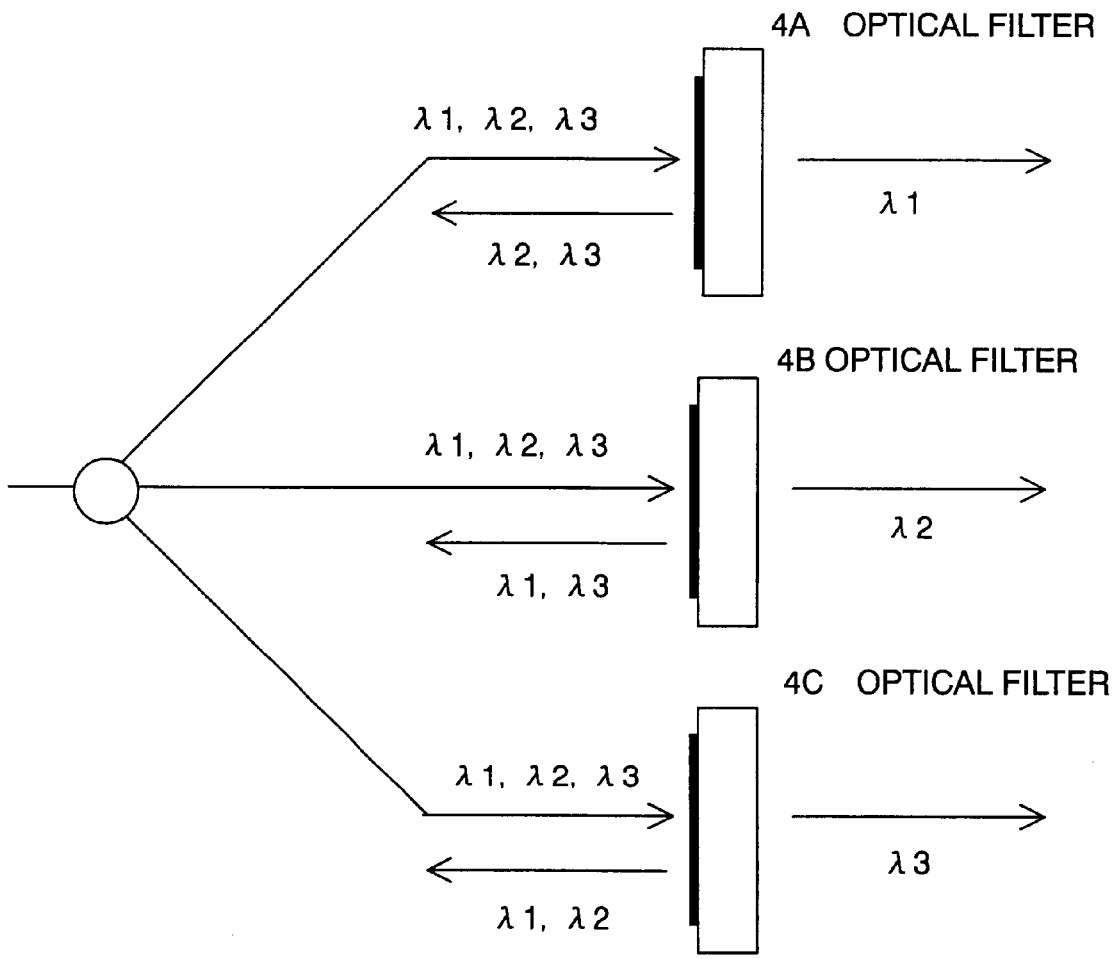
FIG. 1 is a schematic diagram showing an optical filter according to this invention in a working state.

Now, this invention will be described more in detail in conjunction with examples.

TABLE 1

| Example | SiO$_2$ | Al$_2$O$_3$ | Na$_2$O | K$_2$O | TiO$_2$ | BaO | CaO | SrO | MgO | ZnO | ZrO$_2$ | La$_2$O$_3$ | HfO$_2$ | Y$_2$O$_3$ | Total |
|---|---|---|---|---|---|---|---|---|---|---|---|---|---|---|---|
| 1 | 57.2 | 0.0 | 18.5 | 7.0 | 17.2 | 0 | 0 | 0 | 0 | 0 | 0 | 0 | 0 | 0 | 100 |
| 2 | 56.5 | 0.0 | 11.6 | 13.8 | 18.1 | 0 | 0 | 0 | 0 | 0 | 0 | 0 | 0 | 0 | 100 |
| 3 | 54.2 | 2.0 | 19.0 | 7.1 | 17.7 | 0 | 0 | 0 | 0 | 0 | 0 | 0 | 0 | 0 | 100 |
| 4 | 47.3 | 4.7 | 22.7 | 7.2 | 18.1 | 0 | 0 | 0 | 0 | 0 | 0 | 0 | 0 | 0 | 100 |
| 5 | 42.3 | 4.8 | 23.0 | 7.3 | 18.4 | 0 | 0 | 0 | 0 | 4.3 | 0 | 0 | 0 | 0 | 100 |
| 6 | 44.7 | 4.8 | 23.1 | 7.3 | 18.4 | 0 | 0 | 0 | 0 | 0 | 1.7 | 0 | 0 | 0 | 100 |
| 7 | 39.7 | 10.5 | 23.5 | 7.5 | 18.8 | 0 | 0 | 0 | 0 | 0 | 0 | 0 | 0 | 0 | 100 |
| 8 | 39.9 | 7.7 | 20.1 | 7.5 | 16.2 | 0 | 0 | 0 | 0 | 8.7 | 0 | 0 | 0 | 0 | 100 |
| 9 | 38.6 | 7.2 | 18.8 | 7.0 | 15.9 | 0 | 0 | 0 | 12.5 | 0 | 0 | 0 | 0 | 0 | 100 |
| 10 | 40.0 | 7.4 | 19.5 | 7.2 | 16.5 | 0 | 9.3 | 0 | 0 | 0 | 0 | 0 | 0 | 0 | 100 |
| 11 | 44.2 | 8.2 | 21.5 | 8.0 | 18.2 | 0 | 0 | 0 | 0 | 0 | 0 | 1.8 | 0 | 0 | 100 |
| 12 | 40.9 | 7.0 | 20.0 | 7.5 | 16.1 | 0 | 0 | 0 | 0 | 8.6 | 0 | 0 | 0 | 0 | 100 |
| 13 | 55.3 | 2.0 | 20.4 | 4.9 | 17.5 | 0 | 0 | 0 | 0 | 0 | 0 | 0 | 0 | 0 | 100 |
| 14 | 41.0 | 7.1 | 20.4 | 6.9 | 12.2 | 0 | 0 | 0 | 12.4 | 0 | 0 | 0 | 0 | 0 | 100 |
| 15 | 50.4 | 2.0 | 18.2 | 6.2 | 23.2 | 0 | 0 | 0 | 0 | 0 | 0 | 0 | 0 | 0 | 100 |
| 16 | 43 | 5.5 | 18 | 6 | 15.5 | 6 | 0 | 0 | 6 | 0 | 0 | 0 | 0 | 0 | 100 |
| 17 | 43 | 5.5 | 18 | 6 | 15.5 | 0 | 0 | 7.5 | 4.5 | 0 | 0 | 0 | 0 | 0 | 100 |
| 18 | 40 | 7.8 | 18.8 | 7.3 | 16.5 | 0 | 0 | 0 | 0 | 9.6 | 0 | 0 | 0 | 0 | 100 |
| 19 | 44.5 | 4.8 | 23.1 | 7.3 | 18.5 | 0 | 0 | 0 | 0 | 0 | 0 | 1.8 | 0 | 0 | 100 |
| 20 | 44.5 | 4.8 | 23.1 | 7.3 | 18.3 | 0 | 0 | 0 | 0 | 0 | 0 | 0 | 0 | 2 | 100 |
| 21 | 47.2 | 2.7 | 13.8 | 13.8 | 15.5 | 0 | 0 | 0 | 5.2 | 1.8 | 0 | 0 | 0 | 0 | 100 |
| 22 | 47.8 | 2.0 | 17.8 | 9.8 | 15.5 | 0 | 0 | 0 | 5.2 | 1.9 | 0 | 0 | 0 | 0 | 100 |

| Example | Total of R'O | Average Linear Thermal Expansion Coefficient (10$^7$/K) | Temperature Drift (nm/K) | Knoop Hardness (MPa) |
|---|---|---|---|---|
| 1 | 0.0 | 105.0 | 0.0013 | 650 |
| 2 | 0.0 | 106.6 | 0.0006 | 630 |
| 3 | 0.0 | 106.6 | 0.0015 | 650 |
| 4 | 0.0 | 118.1 | −0.0008 | 570 |
| 5 | 4.3 | 114.8 | −0.0003 | 460 |
| 6 | 0.0 | 114.0 | −0.0001 | 470 |
| 7 | 0.0 | 114.8 | 0.0002 | 460 |
| 8 | 8.7 | 111.5 | 0.0005 | 460 |
| 9 | 12.5 | 109.9 | 0.0004 | 460 |
| 10 | 9.3 | 111.5 | 0.0002 | 490 |
| 11 | 0.0 | 109.9 | 0.0011 | 460 |
| 12 | 8.6 | 106.6 | 0.0014 | 455 |
| 13 | 0.0 | 100.9 | 0.0017 | 600 |
| 14 | 12.4 | 102.5 | 0.0020 | 500 |
| 15 | 0.0 | 100.9 | 0.0015 | 610 |
| 16 | 12.0 | 106.5 | 0.0008 | 470 |
| 17 | 12.0 | 105.2 | 0.0013 | 460 |
| 18 | 9.6 | 108.3 | 0.0012 | 460 |
| 19 | 0.0 | 113.8 | 0.0002 | 470 |
| 20 | 0.0 | 112.4 | −0.0001 | 470 |
| 21 | 7.0 | 111.2 | 0.0002 | 470 |
| 22 | 7.1 | 111.8 | 0.0007 | 510 |

Examples 1–22

Table 1 shows a composition and an average linear thermal expansion coefficient over a temperature range between −30 and +70° C. in connection with each of Examples 1–22 that has a glass substrate for a WDM filter according to this invention. The content of each component in the table is represented in mol %. The linear thermal expansion coefficient is represented in a unit of 10$^{-7}$/K. RO represents a total amount or content of a divalent component.

The glass of this invention was prepared in the following manner. As a material of each component, use was made of oxide, carbonate, nitrate, or the like corresponding to the component. To obtain the composition given in Table 1, the materials were weighed and sufficiently mixed to prepare a glass raw material. The raw material was supplied into a platinum crucible, melted at a temperature between 1200 and 1450° C. by the use of an electric furnace, stirred, refined, homogenized, cast into a mold appropriately preheated, solidified, and gradually cooled.

Description will be made about the glass of the composition in Example 1 by way of example. Specifically, the materials weighed and sufficiently mixed were supplied into the platinum crucible and melted for two hours in the electric furnace preliminarily held at 1350° C. in accordance with the above-mentioned steps.

In each Example, the batch can easily be melted and homogenized and no devitrification was observed in the glass prepared.

The glass prepared as mentioned above was shaped into a substrate of a size of 30 mmφ and 1 mm thick and subjected to polishing on its both surfaces. Thus, the glass substrate for a WDM filter was prepared.

The glass in each Example has the average linear thermal expansion coefficient exceeding 100×10$^{-7}$/K. Herein, it is to be noted that the average linear thermal expansion coefficient was measured by a laser interferometry type thermal expansion meter that uses a laser beam and optical interference.

Each glass was pulverized, put into a platinum basket, and immersed into pure water in a flask. After treatment in a boiling water bath for one hour, reduction in weight was measured. As a result, the reduction in weight was 0.1% or less for each glass. Thus, it has been confirmed that the chemical durability was excellent.

More specifically, provision was made about a glass substrate specimen which was polished and which had a thickness of 1 mm. On the glass substrate specimen is coated a dielectric multilayer which is formed by alternately depositing $Ta_2O_5$ and $SiO_2$ films. Such a method of depositing the dielectric multilayer may be a method that is usually used to deposit optical films and may be, for example, an IAD (Ion Assisted Deposition) method or the like.

In the example mentioned above, the film of $Ta_2O_5$ was deposited on the glass substrate surface to a thickness of 24 $\mu$m and, as a result, was in contact with the glass substrate. A high temperature/high humidity test was executed in connection with both the coated surface and an uncovered surface of the glass substrate at a temperature of 85° C. in an atmosphere of relative humidity of 85% for 600 hours. The high temperature/high humidity test may be a typical method used in this technical field. After the test, both the surfaces of the glass substrate were observed by eyes and a microscope to estimate reactions and degradation on the surfaces. As a result of the observation, no blur was observed on the uncovered surface of the glass substrate specimen. Likewise, no reaction was observed on the glass surface covered with the optical multilayer. In addition, no peeling off of the optical multilayer from the glass substrate specimen was also observed.

Reference Example

Preparation was made about fluorophosphate glass which had a composition of 20% $P_2O_5$—20% $AlF_3$—24% $CaF_2$—20% $SrF_2$—16% BaO (mol %) and alkali silicate glass which had a composition of 30% $Na_2O$—70% $SiO_2$ (mol %). The steps were similar to Examples 1 through 22. The melting temperature was 1050° C. and 1250° C. in the fluorophosphate glass and the alkali silicate glass, respectively. The average linear thermal expansion coefficients were $125 \times 10^{-7}$/K and $112 \times 10^{-7}$/K in the fluorophosphate glass and the alkali silicate glass, respectively.

Each glass was pulverized, put into a platinum basket, immersed into pure water in a flask. After treatment in a boiling water bath for one hour, reduction in weight was measured. As a result, the reduction in weight was 0.25% and 5% in the former and the latter, respectively. Thus, it has been confirmed that the chemical durability was different as compared with the glass in the above-mentioned Example.

Experimental Example 23

Figure 3:
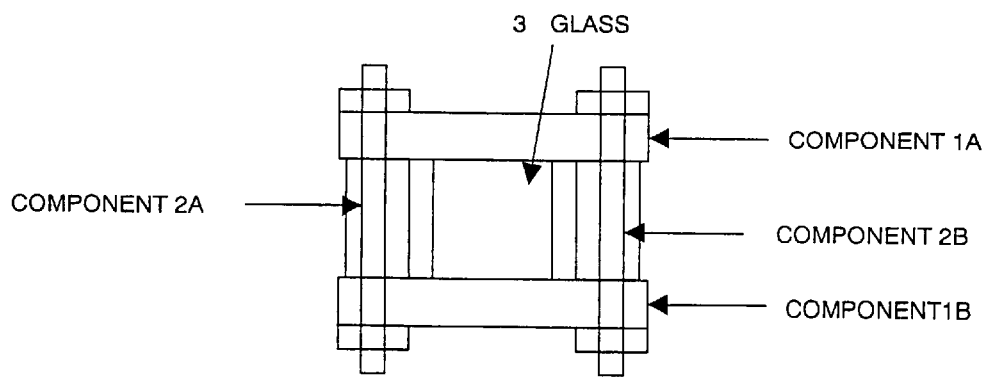
FIG. 3 is a view showing measurement of distortion in a glass.

A glass block having the composition given in Example 5 was shaped into a dimension of 1×1×1 cm and subjected to polishing on two opposite surfaces thereof. Thereafter, the glass block was clamped by a fixing jig shown in FIG. 3. The fixing jig was made of SUS410 (thermal expansion coefficient being $110 \times 10^{-7}$K). Components 1A,B and components 2A,B were fixed by the use of bolts inserted into through holes to clamp the glass. Each of the components 1A,B has a size of 1×2×2.5 cm while each of the components 2A, B has a size of 1×1×1 cm.

After the glass was fixed by the fixing jig, it was confirmed in accordance with the Japanese Optical Glass Industrial Standards "JOGIS 14-1975 Measuring Method for Strain of Optical Glass" that no internal strain occurred at the room temperature (23° C.). Thereafter, the glass and the fixing jig were cooled down to −25° C. The strain was then caused in the glass and was similarly evaluated. As a result, the strain of 1 nm was obtained. Thus, it has been confirmed that the strain induced by the variation in temperature and resulting from the difference in thermal expansion coefficient between the glass and the fixing jig is very small.

Comparative Example 1

A borosilicate optical glass BK7 ($SiO_2$, $B_2O_3$, $Na_2O$, and $K_2O$ being 74 mol %, 9 mol %, 11 mol %, and 6 mol %, respectively) was shaped into a size of 1×1×1 cm and subjected to polishing on two opposite surfaces thereof. Thereafter, in the manner similar to Example 23, the glass was clamped by the fixing jig shown in FIG. 3 to be fixed. The glass had a thermal expansion coefficient of $75 \times 10^{-7}$/K. In the manner similar to Example 22, the glass and the fixing jig were cooled. The strain was then caused in the glass and was similarly evaluated. As a result, the strain of 8 nm was obtained. Thus, it has been confirmed that the large strain was induced due to the variation in temperature.

Example 24

On the surface of each of the glass substrates for a WDM filter having the compositions shown in Table 1, a 1.55 $\mu$m bandpass filter of a Fabry-Perot type was formed by the use of $Ta_2O_5$ and $SiO_2$ as a high refractive index material and a low refractive index material, respectively. The film structure was given by a combination of the glass substrate/(HL)$^7$/H$^2$L(HL)$^7$H/air, wherein H is representative of a high refractive index dielectric film; L, a low refractive index dielectric film. From this fact, it is readily understood that the above-mentioned structure was given by successively depositing, from the glass substrate side, seven combinations of H and L films (fourteen films in total) alternately deposited, two H films on the seven combinations mentioned above, a single L film on the two H films, seven combinations of alternate H and L films on the single L film, and a single H film on the seven combinations. Herein, each of the low refractive index dielectric film was formed by $SiO_2$ as a starting material while each of the high refractive index dielectric films was formed by $Ta_2O_5$ as a starting material. The substrate temperature was 350° C.

Measurement was made of the temperature dependency of the center wavelength of the optical filter at a temperature between −20 and +40° C. For the glass having the composition of Example 10, the value of +0.0002 nm/K was obtained. Thus, it was confirmed that the thermal stability was very excellent. The glasses of the other compositions were similarly evaluated. As shown in the last column in [Table 1], the values between −0.0008 nm/K and +0.0020 nm/K were obtained. Thus, it was confirmed that the thermal stability was very excellent.

Herein, it is noted that the transmittance and the reflection characteristics concerned with an incident light beam can be calculated from the refractive indexes and the thicknesses of the respective films in the film structure and depend on the wavelength and the polarization plane of the incident light beam. Each film in the film structure, namely, the multilayer has an optical thickness which is usually equal to one-fourth of the wavelength ($\lambda$/4) or an integral multiple of the one-fourth of the wavelength ($\lambda$/4). The high refractive index material may be, for example, $TiO_2$, $Ta_2O_5$, $HfO_2$, $ZrO_2$, $CeO_2$, $Al_2O_3$, $Y_2O_3$, ZnS, MgO, $La_2O_3$, CdS, and Si while the low refractive index material may be, for example, $SiO_2$, $MgF_2$, and $ThF_4$.

Such an optical multilayer constitutes an interference filter of the Fabry-Perot type and has a high transmittance within a narrow wavelength range and a high reflection characteristic in a wavelength range near to the narrow wavelength range to reject the light beam in the near wavelength range. As a result, the optical filter which has the above-mentioned optical multilayer is appropriately available as the WDM optical filter.

Example 25

Provision was made about a glass substrate which had a diameter of 50 mm and a thickness of 12 mm and which had a composition of 46.5 mol % $SiO_2$, 3.3 mol % $Al_2O_3$, 19.6 mol % $Na_2O$, 7.0 mol % $K_2O$, 16.6 mol % $TiO_2$, 5.2 mol % MgO, and 1.8 mol % ZnO. The glass substrate was polished on both surfaces thereof. Thereafter, an optical multilayer which formed the 50 GHz-type Fabry-Perot interference filter having a pass band of 1544 nm was deposited on one of the surfaces. In the 50 GHz WDM transmission system mentioned before, an interval between high transmittance bands (namely, the interval between the center frequencies of the transmittance bands) was equal to 50 GHz, or 0.4 nm. Specifically, the optical multilayer was deposited to a total thickness between 30 μm and 40 μm and was formed by alternate stacks of $Ta_2O_5$ and $SiO_2$ films which exceeded 100 films in number. After deposition of the optical multilayer, the glass substrate was thinned from the uncovered surface side to a thickness of 1 mm to expose a rear surface subjected to optical polishing. On the rear surface exposed by the optical polishing, an anti-reflection coating was applied. Thereafter, the glass substrate processed in the above-mentioned manner was cut into a plurality of pieces each of which had a typical size of 1.4 mm×1.4 mm in this technical field and which were operable as optical filters. Each of the optical filters was estimated about temperature stability at the center wavelength of the transmittance band which may be called a transmission center wavelength.

Figure 4:
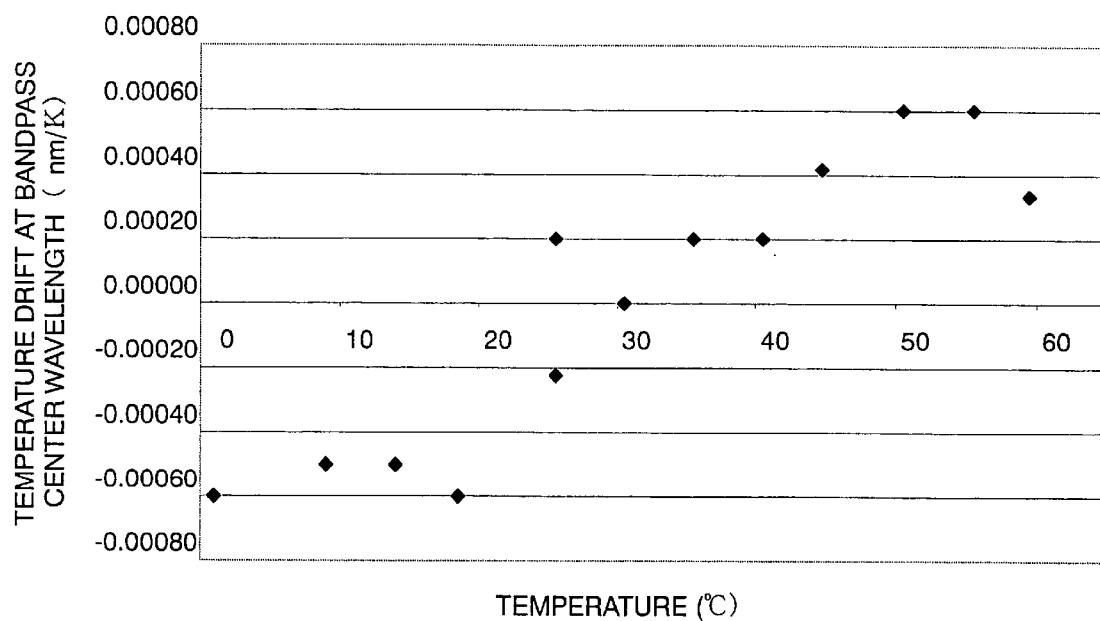
FIG. 4 is a graphical representation for use in describing a relationship between a temperature and a temperature drift at a center wavelength of an optical filter illustrated in a twenty-fourth embodiment.

Referring to FIG. 4, illustration is made about a variation of a transmission center wavelength within a temperature range between 0 and 60° C. It is noted that the above-mentioned temperature range is very important for estimating filter characteristics. As shown in FIG. 4, a negative temperature drift has been observed at a temperature not higher than 25° C. while a positive temperature drift has been observed at a temperature higher than 25° C., namely, not lower than 30° C. However, it has been found out that such temperature drifts are extremely small, as readily understood from FIG. 4. Taking this into consideration, it can be concluded that an average temperature drift is very small within the illustrated temperature range and that the temperature drift may be regarded as zero at a temperature adjacent to a temperature range changed from the negative temperature drift to the positive temperature drift. If the above-mentioned temperature is determined as a main available temperature (room temperature), an extremely stable temperature characteristic can be established within a usual working environment (not so high temperature environment).

As mentioned before, it is to be noted that the temperature drift can be rendered into substantial zero at the room temperature by adjusting each amount of $R_2O$ and $TiO_2$ included in the glass substrate.

The temperature drift shown in FIG. 4 is measured in a comparatively narrow temperature region adjacent to the room temperature. However, it has been confirmed that an average temperature drift was equal to −0.0004 nm/K within the temperature region between −20° C. and +40° C., when the estimation has been carried out in a manner similar to Example 24. The glass of the optical filter had an average linear thermal expansion coefficient of 112.5×10⁻⁷/K within the temperature range between −30° C. and +70° C.

Figure 5:
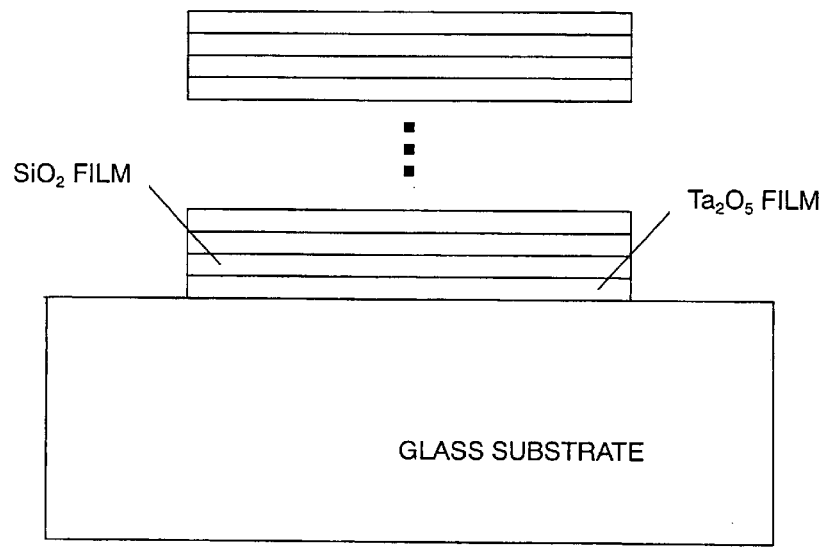
FIG. 5 is a diagrammatic view for use in describing a structure of the optical filter according to the twenty-fourth embodiment.

Referring to FIG. 5, the optical filter for WDM has a glass substrate and a stack of $Ta_2O_5$ and $SiO_2$ films alternately deposited on the glass substrate. In the illustrated example, the $Ta_2O_5$ film is in contact with the glass substrate, as mentioned before, and the $Ta_2O_5$ films and the $SiO_2$ films are partially omitted from this figure.

Figure 6:
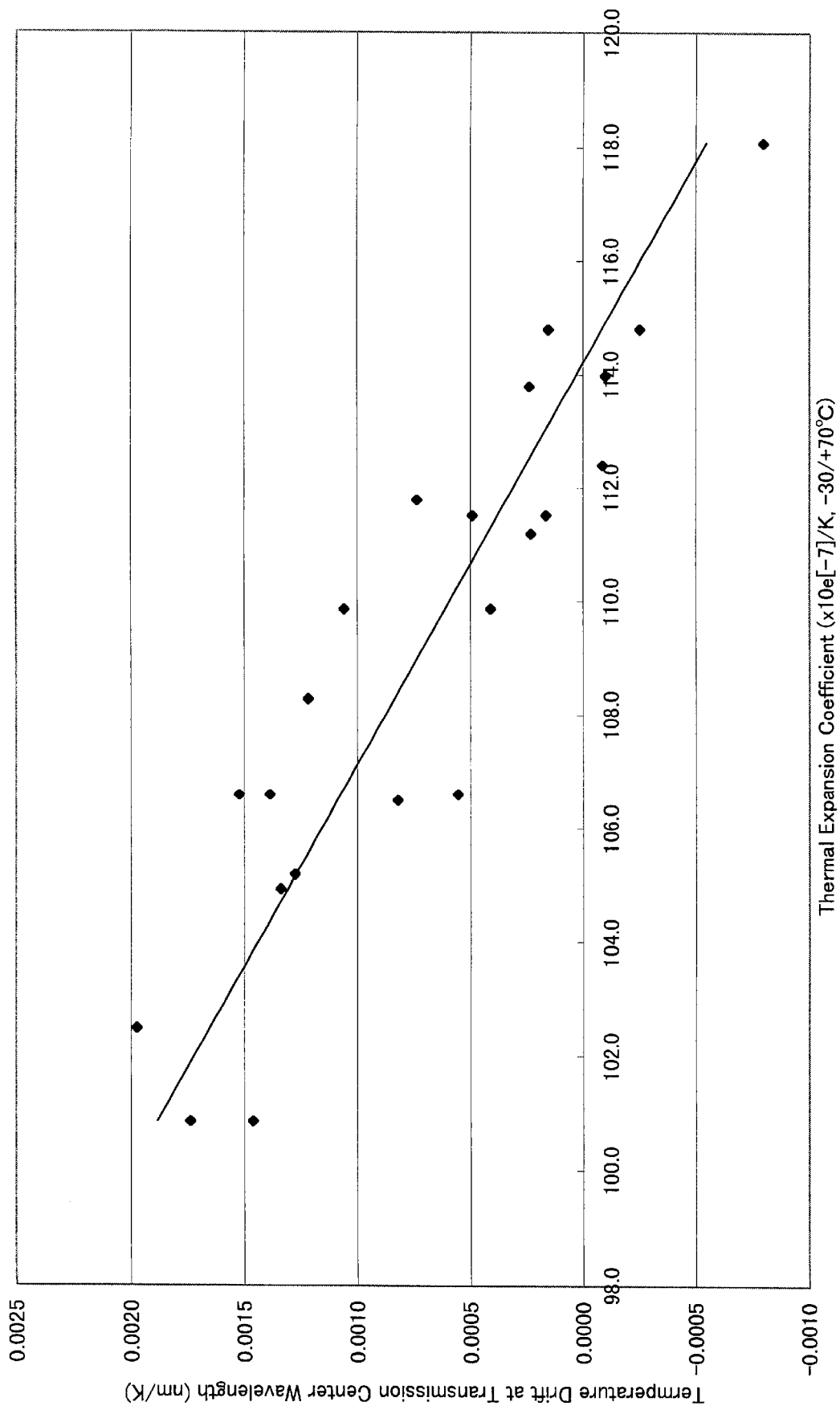
FIG. 6 is a graphical representation for use in describing a relationship between a temperature drift at the center wavelength of the above-mentioned optical filter and an average linear thermal expansion coefficient, wherein use is made about glass substrates according to first through twenty-second examples (will be described as Examples 1 through 22).

Referring to FIG. 6, an average linear thermal expansion coefficient and a temperature drift at the transmission center wavelength are taken along the abscissa and the ordinate, respectively. Herein, the optical filter is structured by the use of each glass substrate enumerated as Examples 1 to 22 and a relationship between the average linear thermal expansion coefficient and the temperature drift is illustrated about each optical filter.

Comparative Example 2

In the manner similar to Example 24, a bandpass filter was prepared by the use of a borosilicate optical glass BK7 as a substrate glass.

In the manner similar to Example 24, measurement was made of the temperature dependency of the peak wavelength. As a result, the value of 0.0055 nm/K was obtained. It was thus confirmed that the thermal stability was poor as compared with the filter of this invention.

Example 26

Next, description will be made about an embodiment according to the WDM optical filter of this invention. FIG. 1 shows a schematic diagram for use in describing an operation of optical multiplexing/demultiplexing carried out by optical multiplexer/demultiplexer.

On the glass substrate which is formed by glass selected from Examples 1 to 22, a dielectric multilayer film is deposited to prepare optical filters (4A, 4B, 4C) having transmission wavelengths λ1, λ2, and λ3, respectively, and reflecting other wavelengths. Signal light composed of the wavelengths λ1, λ2, and λ3 is supplied to these filters. Then, the signal light is split or demultiplexed into the wavelengths λ1, λ2, and λ3 after passing through the filters. Thus, the above-mentioned structure serves as a device for splitting or demultiplexing multiple wavelength light into individual wavelengths. If the light traveling direction is reversed to that illustrated in the figure, the structure serves as a device for multiplexing or combining the wavelengths λ1, λ2, and λ3 together.

Figure 2:
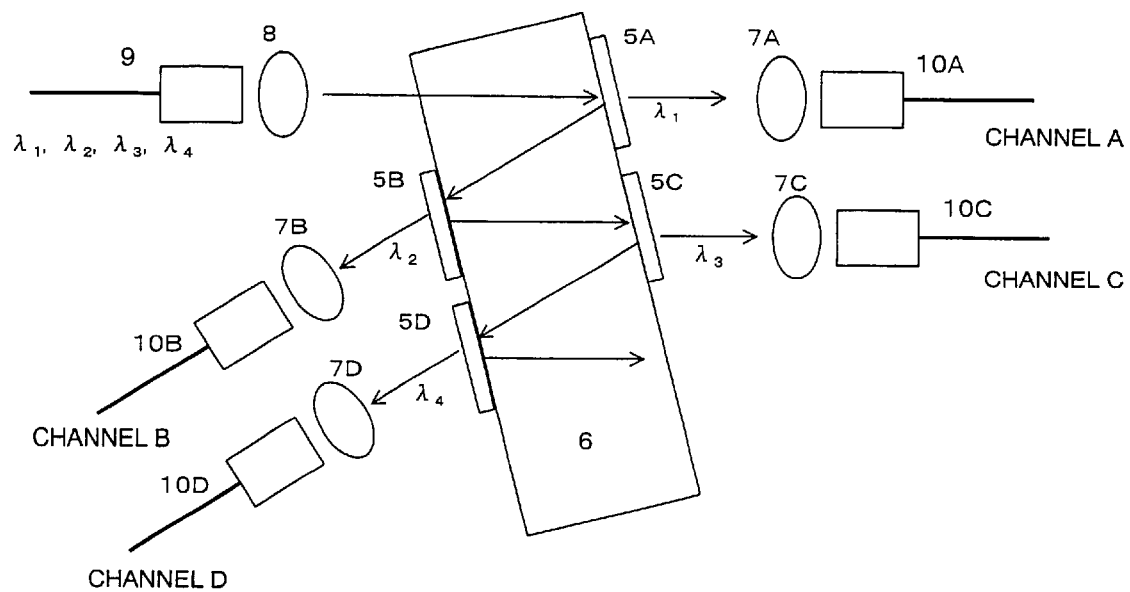
FIG. 2 is a schematic diagram showing an application of the optical multiplexer/demultiplexer of this invention.

Next, FIG. 2 shows a schematic diagram for use in describing an optical multiplexer/demultiplexer (combiner/splitter) for demultiplexing or splitting each wavelength component from a signal light beam including four wavelength components.

As illustrated in the figure, an optical demultiplexer or splitter is obtained by preparing optical filters (5A, 5B, 5C, 5D) formed by the use of glass selected from Examples 1 to 22 and by fixing each optical filter to a base member 6 transparent for a signal light wavelength band. These filters have transmission wavelengths λ1, λ2, λ3, and λ4, respectively. Signal light (wavelengths: λ1, λ2, λ3, λ4) emitted from a single-mode fiber (SMF) 9 is collimated by a lens 8 and is incident to the optical demultiplexer or splitter apparatus as illustrated in the figure. The wavelength λ1 light is transmitted through the optical filter 5A, coupled by a lens 7A to an SMF 10A, and is emitted from a channel A. The wavelength λ2 light, the wavelength λ3 light, and the wavelength λ4 light are reflected by the optical filter 5A to be incident to the optical filter 5B as illustrated in the figure. At the optical filter 5B, the wavelength λ2 light is split or demultiplexed to be emitted from a channel B in the manner similar to that mentioned above. Likewise, the λ3 light and the λ4 light are emitted from channels C and D, respectively.

In wavelength multiplexing transmission, let the optical multiplexer/demultiplexer apparatus have a single mode fiber (SMF) 9 arranged on a transmission side and single mode fibers (SMFs) 10A–D arranged on a reception side. Under the circumstances, the apparatus serves as an optical demultiplexing apparatus for demultiplexing a single light beam into a plurality of the wavelengths. If the light traveling direction is reversed to that illustrated in the figure, the apparatus serves as an optical multiplexing apparatus for multiplexing a plurality of light beams into a single light beam having multiple wavelengths. At any rate, it is possible to attain the optical multiplexer/demultiplexer apparatus which has a temperature drift between −0.0025 nm/K and +0.0025 nm/K and which has therefore a high reliability. Particularly, the illustrated optical multiplexer/demultiplexer apparatus has a high reliability in wavelength multiplexing communication in which wavelength components are very close to one another with a high density.

According to this invention, there are obtained the glass substrate which has a sufficient hardness, an excellent weather resistance characteristic, and the desired average linear thermal expansion coefficient, and which is appropriate for the wavelength division multiplexing (WDM) optical filter. In addition, there are also obtained the WDM optical filter and the optical multiplexer/demultiplexer apparatus which is very scarce in the temperature drift at the center wavelength within the pass band and which has a high reliability against a temperature variation. Furthermore, it is possible to make the temperature drift minimum in the temperature range used as the optical filter, by adjusting amounts of specific glass components included in glass used as the glass material.

What is claimed is:

1. A glass substrate for use in a WDM optical filter which has an optical multilayer coated on a surface of the glass substrate;

said glass substrate being formed by glass which includes $SiO_2$ and which has an average linear thermal expansion coefficient between $100×10^{-7}$/K and $130×10^{-7}$/K within a temperature range between −30° C. and +70° C.

2. A glass substrate for use in a WDM optical filter which has an optical multilayer coated on a surface of the glass substrate, the glass substrate being formed by glass which includes, as essential components, $SiO_2$, $R_2O$ (R: alkali metal element), and $TiO_2$, the essential components being not smaller than 60 mol % in total.

3. A glass substrate for use in a WDM optical filter which has an optical multilayer coated on a surface of the glass substrate, the glass substrate being formed by glass which includes, as essential components, $SiO_2$, $R_2O$ (R: alkali metal element), and $TiO_2$, each amount of the essential components being greater than each amount of the remaining components other than the essential components.

4. A glass substrate as claimed in claim 2, wherein the glass comprises, by mol %,

| | |
|---|---|
| $SiO_2$ | 38–58%, |
| $TiO_2$ | 7–30%, |
| $Al_2O_3$ | 0–12%, and |
| total amount of $R_2O$ | 15–40%. |

5. A glass substrate as claimed in claim 4, wherein the glass comprises, by mol %, as $R_2O$,

| | |
|---|---|
| $Na_2O$ | 10–25%, and |
| $K_2O$ | 4–15%. |

6. A glass substrate as claimed in claim 2, wherein the glass comprises, by mol %,

| | |
|---|---|
| $SiO_2$ | 38–55% |
| $Na_2O$ | 13–25% |
| $K_2O$ | 1–50% |
| $TiO_2$ | 0–25% |
| $Al_2O_3$ | 0.5–8%. |

7. A glass substrate as claimed in claim 2, wherein the glass includes at least one species of oxides RO selected from a group consisting of alkaline earth metal oxides and zinc oxide.

8. A glass substrate as claimed in claim 7, wherein the glass includes, by mol %, a total amount of RO between 2 and 15%.

9. A glass substrate as claimed in claim 8, wherein the glass includes, as RO,

| | |
|---|---|
| MgO | 0–13%, |
| CaO | 0–10%, |
| SrO | 0–8%, |
| BaO | 0–6%, and |
| ZnO | 0–10%. |

10. A glass substrate as claimed in claim 7, wherein the glass includes, by mol %,

| | |
|---|---|
| MgO | 1–13%, |
| ZnO | 0.5–10%, and |
| $Sb_2O_3$ | 0–1%. |

11. A glass substrate as claimed in claim 2, wherein the glass includes, by mol %,

| | |
|---|---|
| $ZrO_2$ | 0–2% |
| $HfO_2$ | 0–2% |
| $La_2O_3$ | 0–2%, and |
| $Y_2O_3$ | 0–2%. |

12. A glass substrate as claimed in claim 3, wherein the average linear thermal expansion coefficient falls within a range between $100×10^{-7}$/K and $130×10^{-7}$/K in a temperature range between −30° C. and +70° C.

13. A glass substrate as claimed in claim 2, wherein the average linear thermal expansion coefficient falls within a range between $105 \times 10^{-7}/K$ and $120 \times 10^{-7}/K$. in a temperature range between $-30°$ C. and $+70°$ C.

14. A glass substrate as claimed in claim 3, wherein a Knoop hardness is not smaller than 455 MPa.

15. An optical filter for use in an optical multiplexer/demultiplexer apparatus, comprising:
    a glass substrate claimed in claim 3 and an optical multilayer on the glass substrate.

16. An optical filter as claimed in claim 15, wherein a temperature drift at a center wavelength of a pass band falls within a range between $-0.0025$ nm/K and $+0.0025$ nm/K.

17. An optical multiplexer/demultiplexer apparatus comprising:
    the optical filter claimed in claim 15.

18. A method of manufacturing glass which is used as a glass substrate of a wavelength division multiplexing (WDM) optical filter formed by depositing an optical multilayer which is fixedly attached to a surface of the glass substrate and which has a band pass filter function, the method comprising the steps of:
    adjusting amounts of alkali metal oxides and $TiO_2$ operable as glass components so that an average linear thermal expansion coefficient falls within a coefficient range between $100 \times 10^{-7}$ and $130 \times 10^{-7}/K$ within a temperature range from $-30°$ C. to $+70°$ C.

19. A method as claimed in claim 18, wherein the amounts of $R_2O$ and $TiO_2$ are adjusted with reference to an available temperature range of the optical filter so that a temperature drift becomes minimum at a center wavelength of a pass band of the optical multilayer within the above-mentioned temperature range.

20. A glass substrate as claimed in claim 3, wherein the glass comprises, by mol %,

| | |
|---|---|
| $SiO_2$ | 38–58%, |
| $TiO_2$ | 7–30%, |
| $Al_2O_3$ | 0–12%, and |
| total amount of $R_2O$ | 15–40%. |

21. A glass substrate as claimed in claim 20, wherein the glass comprises, by mol %, as $R_2O$,

| | |
|---|---|
| $Na_2O$ | 10–25%, and |
| $K_2O$ | 4–15%. |

22. A glass substrate as claimed in claim 3, wherein the glass comprises, by mol %,

| | |
|---|---|
| $SiO_2$ | 38–55% |
| $Na_2O$ | 13–25% |
| $K_2O$ | 2–15% |
| $TiO_2$ | 10–25% |
| $Al_2O_3$ | 0.5–8%. |

23. A glass substrate as claimed in claim 3, wherein the glass includes at least one species of oxides RO selected from a group consisting of alkaline earth metal oxides and zinc oxide.

24. A glass substrate as claimed in claim 23, wherein the glass includes, by mol %, a total amount of RO between 2 and 15%.

25. A glass substrate as claimed in claim 24, wherein the glass includes, as RO,

| | |
|---|---|
| MgO | 0–13%, |
| CaO | 0–10%, |
| SrO | 0–8% |
| BaO | 0–6%, and |
| ZnO | 0–10%. |

26. A glass substrate as claimed in claim 23, wherein the glass includes, by mol %,

| | |
|---|---|
| MgO | 1–13%, |
| ZnO | 0.5–10%, and |
| $Sb_2O_3$ | 0–1%. |

27. A glass substrate as claimed in claim 24, wherein the glass includes, by mol %,

| | |
|---|---|
| MgO | 1–13%, |
| ZnO | 0.5–10%, and |
| $Sb_2O_3$ | 0–1%. |

28. A glass substrate as claimed in claim 25, wherein the glass includes, by mol %,

| | |
|---|---|
| MgO | 1–13%, |
| ZnO | 0.5–10%, and |
| $Sb_2O_3$ | 0–1%. |

29. A glass substrate as claimed in claim 4, wherein the glass includes at least one species of oxides RO selected from a group consisting of alkaline earth metal oxides and zinc oxide.

30. A glass substrate as claimed in claim 29, wherein the glass includes, by mol %, a total amount of RO between 2 and 15%.

31. A glass substrate as claimed in claim 30, wherein the glass includes, as RO,

| | |
|---|---|
| MgO | 0–13%, |
| CaO | 0–10%, |
| SrO | 0–8% |
| BaO | 0–6%, and |
| ZnO | 0–10%. |

32. A glass substrate as claimed in claim 29 wherein the glass includes, by mol %,

| | |
|---|---|
| MgO | 1–13%, |
| ZnO | 0.5–10%, and |
| $Sb_2O_3$ | 0–1%. |

33. A glass substrate as claimed in claim 30, wherein the glass includes, by mol %,

| | |
|---|---|
| MgO | 1–13%, |
| ZnO | 0.5–10%, and |
| $Sb_2O_3$ | 0–1%. |

34. A glass substrate as claimed in claim 31, wherein the glass includes, by mol %,

| | |
|---|---|
| MgO | 1–13%, |
| ZnO | 0.5–10%, and |
| Sb$_2$O$_3$ | 0–1%. |

35. A glass substrate as claimed in claim 5, wherein the glass includes at least one species of oxides RO selected from a group consisting of alkaline earth metal oxides and zinc oxide.

36. A glass substrate as claimed in claim 35, wherein the glass includes, by mol %, a total amount of RO between 2 and 15%.

37. A glass substrate as claimed in claim 36, wherein the glass includes, as RO,

| | |
|---|---|
| MgO | 0–13%, |
| CaO | 0–10%, |
| SrO | 0–8% |
| BaO | 0–6%, and |
| ZnO | 0–10%. |

38. A glass substrate as claimed in claim 35, wherein the glass includes, by mol %,

| | |
|---|---|
| MgO | 1–13%, |
| ZnO | 0.5–10%, and |
| Sb$_2$O$_3$ | 0–1%. |

39. A glass substrate as claimed in claim 36, wherein the glass includes, by mol %,

| | |
|---|---|
| MgO | 1–13%, |
| ZnO | 0.5–10%, and |
| Sb$_2$O$_3$ | 0–1%. |

40. A glass substrate as claimed in claim 37, wherein the glass includes, by mol %,

| | |
|---|---|
| MgO | 1–13%, |
| ZnO | 0.5–10%, and |
| Sb$_2$O$_3$ | 0–1%. |

41. A glass substrate as claimed in claim 6, wherein the glass includes at least one species of oxides RO selected from a group consisting of alkaline earth metal oxides and zinc oxide.

42. A glass substrate as claimed in claim 41, wherein the glass includes, by mol %, a total amount of RO between 2 and 15%.

43. A glass substrate as claimed in claim 42, wherein the glass includes, as RO,

| | |
|---|---|
| MgO | 0–13%, |
| CaO | 0–10%, |
| SrO | 0–8% |
| BaO | 0–6%, and |
| ZnO | 0–10%. |

44. A glass substrate as claimed in claim 41, wherein the glass includes, by mol %,

| | |
|---|---|
| MgO | 1–13%, |
| ZnO | 0.5–10%, and |
| Sb$_2$O$_3$ | 0–1%. |

45. A glass substrate as claimed in claim 42, wherein the glass includes, by mol %,

| | |
|---|---|
| MgO | 1–13%, |
| ZnO | 0.5–10%, and |
| Sb$_2$O$_3$ | 0–1%. |

46. A glass substrate as claimed in claim 43, wherein the glass includes, by mol %,

| | |
|---|---|
| MgO | 1–13%, |
| ZnO | 0.5–10%, and |
| Sb$_2$O$_3$ | 0–1%. |

47. A glass substrate as claimed in claim 3, wherein the glass includes, by mol %,

| | |
|---|---|
| ZrO$_2$ | 0–2%, |
| HfO$_2$ | 0–2%, |
| La$_2$O$_3$ | 0–2%, and |
| Y$_2$O$_3$ | 0–2%. |

48. A glass substrate as claimed in claim 4, wherein the glass includes, by mol %,

| | |
|---|---|
| ZrO$_2$ | 0–2%, |
| HfO$_2$ | 0–2%, |
| La$_2$O$_3$ | 0–2%, and |
| Y$_2$O$_3$ | 0–2%. |

49. A glass substrate as claimed in claim 5, wherein the glass includes, by mol %,

| | |
|---|---|
| ZrO$_2$ | 0–2%, |
| HfO$_2$ | 0–2%, |
| La$_2$O$_3$ | 0–2%, and |
| Y$_2$O$_3$ | 0–2%. |

50. A glass substrate as claimed in claim 6, wherein the glass includes, by mol %,

| | |
|---|---|
| ZrO$_2$ | 0–2%, |
| HfO$_2$ | 0–2%, |
| La$_2$O$_3$ | 0–2%, and |
| Y$_2$O$_3$ | 0–2%. |

51. A glass substrate as claimed in claim 7, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

52. A glass substrate as claimed in claim 8, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

53. A glass substrate as claimed in claim 9, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

54. A glass substrate as claimed in claim 10, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

55. A glass substrate as claimed in claim 20, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

56. A glass substrate as claimed in claim 21, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

57. A glass substrate as claimed in claim 22, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

58. A glass substrate as claimed in claim 23, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

59. A glass substrate as claimed in claim 24, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

60. A glass substrate as claimed in claim 25, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

61. A glass substrate as claimed in claim 26, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

62. A glass substrate as claimed in claim 27, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

63. A glass substrate as claimed in claim 28, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

64. A glass substrate as claimed in claim 29, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

65. A glass substrate as claimed in claim 30, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

66. A glass substrate as claimed in claim 31, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

67. A glass substrate as claimed in claim 32, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

68. A glass substrate as claimed in claim 33, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

69. A glass substrate as claimed in claim 34, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

70. A glass substrate as claimed in claim 35, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

71. A glass substrate as claimed in claim 36, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

72. A glass substrate as claimed in claim 37, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

73. A glass substrate as claimed in claim 38, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

74. A glass substrate as claimed in claim 39, wherein the glass includes, by mol %,

| | |
|---|---|
| $ZrO_2$ | 0–2%, |
| $HfO_2$ | 0–2%. |
| $La_2O_3$ | 0–2%, and |
| $Y_2O_3$ | 0–2%. |

75. A glass substrate as claimed in claim 40, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

76. A glass substrate as claimed in claim 41, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

77. A glass substrate as claimed in claim 42, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

78. A glass substrate as claimed in claim 43, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

79. A glass substrate as claimed in claim 44, wherein the glass includes, by mol %, 80. A glass substrate as claimed in claim 45, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

81. A glass substrate as claimed in claim 46, wherein the glass includes, by mol %,

| | |
|---|---|
| $ZrO_2$ | 0–2%, |
| $HfO_2$ | 0–2%, |
| $La_2O_3$ | 0–2%, and |
| $Y_2O_3$ | 0–2%. |

82. A glass substrate as claimed in claim 3, wherein the average linear thermal expansion coefficient falls within a range between $105\times10^{-7}/K$ and $120\times10^{-7}/K$. in a temperature range between −30° C. and +70° C.

83. A glass substrate as claimed in claim 4, wherein the average linear thermal expansion coefficient falls within a range between $105\times10^{-7}/K$ and $120\times10^{-7}/K$. in a temperature range between −30° C. and +70° C.

84. A glass substrate as claimed in claim 5, wherein the average linear thermal expansion coefficient falls within a range between $105\times10^{-7}/K$ and $120\times10^{-7}/K$. in a temperature range between −30° C. and +70° C.

85. A glass substrate as claimed in claim 6, wherein the average linear thermal expansion coefficient falls within a range between $105\times10^{-7}/K$ and $120\times10^{-7}/K$. in a temperature range between −30° C. and +70° C.

86. A glass substrate as claimed in claim 7, wherein the average linear thermal expansion coefficient falls within a range between $105\times10^{-7}/K$ and $120\times10^{-7}/K$. in a temperature range between −30° C. and +70° C.

87. A glass substrate as claimed in claim 8, wherein the average linear thermal expansion coefficient falls within a range between $105\times10^{-7}/K$ and $120\times10^{-7}/K$. in a temperature range between −30° C. and +70° C.

88. A glass substrate as claimed in claim 9, wherein the average linear thermal expansion coefficient falls within a range between $105\times10^{-7}/K$ and $120\times10^{-7}/K$. in a temperature range between −30° C. and +70° C.

89. A glass substrate as claimed in claim 10, wherein the average linear thermal expansion coefficient falls within a range between $105\times10^{-7}/K$ and $120\times10^{-7}/K$. in a temperature range between −30° C. and +70° C.

90. A glass substrate as claimed in claim 11, wherein the average linear thermal expansion coefficient falls within a range between $105\times10^{-7}/K$ and $120\times10^{-7}/K$. in a temperature range between −30° C. and +70° C.

91. A glass substrate as claimed in claim 20, wherein the average linear thermal expansion coefficient falls within a range between $105\times10^{-7}/K$ and $120\times10^{-7}/K$. in a temperature range between −30° C. and +70° C.

92. A glass substrate as claimed in claim 22, wherein the average linear thermal expansion coefficient falls within a range between $105\times10^{-7}/K$ and $120\times10^{-7}/K$. in a temperature range between −30° C. and +70° C.

93. A glass substrate as claimed in claim 24, wherein the average linear thermal expansion coefficient falls within a range between $105\times10^{-7}/K$ and $120\times10^{-7}/K$. in a temperature range between −30° C. and +70° C.

94. A glass substrate as claimed in claim 25, wherein the average linear thermal expansion coefficient falls within a range between $105\times10^{-7}/K$ and $120\times10^{-7}/K$. in a temperature range between −30° C. and +70° C.

95. A glass substrate as claimed in claim 26, wherein the average linear thermal expansion coefficient falls within a range between $105\times10^{-7}/K$ and $120\times10^{-7}/K$. in a temperature range between −30° C. and +70° C.

96. A glass substrate as claimed in claim 27, wherein the average linear thermal expansion coefficient falls within a range between $105\times10^{-7}/K$ and $120\times10^{-7}/K$. in a temperature range between −30° C. and +70° C.

97. A glass substrate as claimed in claim 28, wherein the average linear thermal expansion coefficient falls within a range between $105\times10^{-7}/K$ and $120\times10^{-7}/K$. in a temperature range between −30° C. and +70° C.

98. A glass substrate as claimed in claim 29, wherein the average linear thermal expansion coefficient falls within a range between $105\times10^{-7}/K$ and $120\times10^{-7}/K$. in a temperature range between −30° C. and +70° C.

99. A glass substrate as claimed in claim 30, wherein the average linear thermal expansion coefficient falls within a range between $105\times10^{-7}/K$ and $120\times10^{-7}/K$. in a temperature range between −30° C. and +70° C.

100. A glass substrate as claimed in claim 31, wherein the average linear thermal expansion coefficient falls within a range between $105\times10^{-7}/K$ and $120\times10^{-7}/K$. in a temperature range between −30° C. and +70° C.

101. A glass substrate as claimed in claim 32, wherein the average linear thermal expansion coefficient falls within a range between $105\times10^{-7}/K$ and $120\times10^{-7}/K$. in a temperature range between −30° C. and +70° C.

102. A glass substrate as claimed in claim 33, wherein the average linear thermal expansion coefficient falls within a range between $105\times10^{-7}/K$ and $120\times10^{-7}/K$. in a temperature range between −30° C. and +70° C.

103. A glass substrate as claimed in claim 34, wherein the average linear thermal expansion coefficient falls within a range between $105\times10^{-7}/K$ and $120\times10^{-7}/K$. in a temperature range between −30° C. and +70° C.

104. A glass substrate as claimed in claim 35, wherein the average linear thermal expansion coefficient falls within a range between $105\times10^{-7}/K$ and $120\times10^{-7}/K$. in a temperature range between −30° C. and +70° C.

105. A glass substrate as claimed in claim 36, wherein the average linear thermal expansion coefficient falls within a range between $105\times10^{-7}/K$ and $120\times10^{-7}/K$. in a temperature range between −30° C. and +70° C.

106. A glass substrate as claimed in claim 37, wherein the average linear thermal expansion coefficient falls within a range between $105\times10^{-7}/K$ and $120\times10^{-7}/K$. in a temperature range between −30° C. and +70° C.

107. A glass substrate as claimed in claim 38, wherein the average linear thermal expansion coefficient falls within a range between $105\times10^{-7}/K$ and $120\times10^{-7}/K$. in a temperature range between −30° C. and +70° C.

108. A glass substrate as claimed in claim 39, wherein the average linear thermal expansion coefficient falls within a range between $105\times10^{-7}/K$ and $120\times10^{-7}/K$. in a temperature range between −30° C. and +70° C.

109. A glass substrate as claimed in claim 40, wherein the average linear thermal expansion coefficient falls within a 110. A glass substrate as claimed in claim 41, wherein the average linear thermal expansion coefficient falls within a range between $105\times10^{-7}$/K and $120\times10^{-7}$/K. in a temperature range between $-30°$ C. and $+70°$ C.

111. A glass substrate as claimed in claim 42, wherein the average linear thermal expansion coefficient falls within a range between $105\times10^{-7}$/K and $120\times10^{-7}$/K. in a temperature range between $-30°$ C. and $+70°$ C.

112. A glass substrate as claimed in claim 43, wherein the average linear thermal expansion coefficient falls within a range between $105\times10^{-7}$/K and $120\times10^{-7}$/K. in a temperature range between $-30°$ C. and $+70°$ C.

113. A glass substrate as claimed in claim 44, wherein the average linear thermal expansion coefficient falls within a range between $105\times10^{-7}$/K and $120\times10^{-7}$/K. in a temperature range between $-30°$ C. and $+70°$ C.

114. A glass substrate as claimed in claim 45, wherein the average linear thermal expansion coefficient falls within a range between $105\times10^{-7}$/K and $120\times10^{-7}$/K. in a temperature range between $-30°$ C. and $+70°$ C.

115. A glass substrate as claimed in claim 46, wherein the average linear thermal expansion coefficient falls within a range between $105\times10^{-7}$/K and $120\times10^{-7}$/K. in a temperature range between $-30°$ C. and $+70°$ C.

116. A glass substrate as claimed in claim 47, wherein the average linear thermal expansion coefficient falls within a range between $105\times10^{-7}$/K and $120\times10^{-7}$/K. in a temperature range between $-30°$ C. and $+70°$ C.

117. A glass substrate as claimed in claim 48, wherein the average linear thermal expansion coefficient falls within a range between $105\times10^{-7}$/K and $120\times10^{-7}$/K. in a temperature range between $-30°$ C. and $+70°$ C.

118. A glass substrate as claimed in claim 49, wherein the average linear thermal expansion coefficient falls within a range between $105\times10^{-7}$/K and $120\times10^{-7}$/K. in a temperature range between $-30°$ C. and $+70°$ C.

119. A glass substrate as claimed in claim 50, wherein the average linear thermal expansion coefficient falls within a range between $105\times10^{-7}$/K and $120\times10^{-7}$/K. in a temperature range between $-30°$ C. and $+70°$ C.

120. A glass substrate as claimed in claim 51, wherein the average linear thermal expansion coefficient falls within a range between $105\times10^{-7}$/K and $120\times10^{-7}$/K. in a temperature range between $-30°$ C. and $+70°$ C.

121. A glass substrate as claimed in claim 52, wherein the average linear thermal expansion coefficient falls within a range between $105\times10^{-7}$/K and $120\times10^{-7}$/K. in a temperature range between $-30°$ C. and $+70°$ C.

122. A glass substrate as claimed in claim 53, wherein the average linear thermal expansion coefficient falls within a range between $105\times10^{-7}$/K and $120\times10^{-7}$/K. in a temperature range between $-30°$ C. and $+70°$ C.

123. A glass substrate as claimed in claim 54, wherein the average linear thermal expansion coefficient falls within a range between $105\times10^{-7}$/K and $120\times10^{-7}$/K. in a temperature range between $-30°$ C. and $+70°$ C.

124. A glass substrate as claimed in claim 55 wherein the average linear thermal expansion coefficient falls within a range between $105\times10^{-7}$/K and $120\times10^{-7}$/K. in a temperature range between $-30°$ C. and $+70°$ C.

125. A glass substrate as claimed in claim 56, wherein the average linear thermal expansion coefficient falls within a range between $105\times10^{-7}$/K and $120\times10^{-7}$/K. in a temperature range between $-30°$ C. and $+70°$ C.

126. A glass substrate as claimed in claim 57, wherein the average linear thermal expansion coefficient falls within a range between $105\times10^{-7}$/K and $120\times10^{-7}$/K. in a temperature range between $-30°$ C. and $+70°$ C.

127. A glass substrate as claimed in claim 58, wherein the average linear thermal expansion coefficient falls within a range between $105\times10^{-7}$/K and $120\times10^{-7}$/K. in a temperature range between $-30°$ C. and $+70°$ C.

128. A glass substrate as claimed in claim 59, wherein the average linear thermal expansion coefficient falls within a range between $105\times10^{-7}$/K and $120\times10^{-7}$/K. in a temperature range between $-30°$ C. and $+70°$ C.

129. A glass substrate as claimed in claim 60, wherein the average linear thermal expansion coefficient falls within a range between $105\times10^{-7}$/K and $120\times10^{-7}$/K. in a temperature range between $-30°$ C. and $+70°$ C.

130. A glass substrate as claimed in claim 61, wherein the average linear thermal expansion coefficient falls within a range between $105\times10^{-7}$/K and $120\times10^{-7}$/K. in a temperature range between $-30°$ C. and $+70°$ C.

131. A glass substrate as claimed in claim 62, wherein the average linear thermal expansion coefficient falls within a range between $105\times10^{-7}$/K and $120\times10^{-7}$/K. in a temperature range between $-30°$ C. and $+70°$ C.

132. A glass substrate as claimed in claim 63, wherein the average linear thermal expansion coefficient falls within a range between $105\times10^{-7}$/K and $120\times10^{-7}$/K. in a temperature range between $-30°$ C. and $+70°$ C.

133. A glass substrate as claimed in claim 64, wherein the average linear thermal expansion coefficient falls within a range between $105\times10^{-7}$/K and $120\times10^{-7}$/K. in a temperature range between $-30°$ C. and $+70°$ C.

134. A glass substrate as claimed in claim 65, wherein the average linear thermal expansion coefficient falls within a range between $105\times10^{-7}$/K and $120\times10^{-7}$/K. in a temperature range between $-30°$ C. and $+70°$ C.

135. A glass substrate as claimed in claim 66, wherein the average linear thermal expansion coefficient falls within a range between $105\times10^{-7}$/K and $120\times10^{-7}$/K. in a temperature range between $-30°$ C. and $+70°$ C.

136. A glass substrate as claimed in claim 67, wherein the average linear thermal expansion coefficient falls within a range between $105\times10^{-7}$/K and $120\times10^{-7}$/K. in a temperature range between $-30°$ C. and $+70°$ C.

137. A glass substrate as claimed in claim 68, wherein the average linear thermal expansion coefficient falls within a range between $105\times10^{-7}$/K and $120\times10^{-7}$/K. in a temperature range between $-30°$ C. and $+70°$ C.

138. A glass substrate as claimed in claim 69, wherein the average linear thermal expansion coefficient falls within a range between $105\times10^{-7}$/K and $120\times10^{-7}$/K. in a temperature range between $-30°$ C. and $+70°$ C.

139. A glass substrate as claimed in claim 70, wherein the average linear thermal expansion coefficient falls within a range between $105\times10^{-7}$/K and $120\times10^{-7}$/K. in a temperature range between $-30°$ C. and $+70°$ C.

140. A glass substrate as claimed in claim 71, wherein the average linear thermal expansion coefficient falls within a range between $105\times10^{-7}$/K and $120\times10^{-7}$/K. in a temperature range between $-30°$ C. and $+70°$ C.

141. A glass substrate as claimed in claim 72, wherein the average linear thermal expansion coefficient falls within a range between $105\times10^{-7}$/K and $120\times10^{-7}$/K. in a temperature range between $-30°$ C. and $+70°$ C.

142. A glass substrate as claimed in claim 73, wherein the average linear thermal expansion coefficient falls within a range between $105\times10^{-7}$/K and $120\times10^{-7}$/K. in a temperature range between $-30°$ C. and $+70°$ C.

143. A glass substrate as claimed in claim 74, wherein the average linear thermal expansion coefficient falls within a range between $105\times10^{-7}$/K and $120\times10^{-7}$/K. in a temperature range between $-30°$ C. and $+70°$ C.

144. A glass substrate as claimed in claim 75, wherein the average linear thermal expansion coefficient falls within a range between $105\times10^{-7}$/K and $120\times10^{-7}$/K. in a temperature range between $-30°$ C. and $+70°$ C.

145. A glass substrate as claimed in claim 76, wherein the average linear thermal expansion coefficient falls within a range between $105\times10^{-7}$/K and $120\times10^{-7}$/K. in a temperature range between $-30°$ C. and $+70°$ C.

146. A glass substrate as claimed in claim 77, wherein the average linear thermal expansion coefficient falls within a range between $105\times10^{-7}$/K and $120\times10^{-7}$/K. in a temperature range between $-30°$ C. and $+70°$ C.

147. A glass substrate as claimed in claim 78, wherein the average linear thermal expansion coefficient falls within a range between $105\times10^{-7}$/K and $120\times10^{-7}$/K. in a temperature range between $-30°$ C. and $+70°$ C.

148. A glass substrate as claimed in claim 79, wherein the average linear thermal expansion coefficient falls within a range between $105\times10^{-7}$/K and $120\times10^{-7}$/K. in a temperature range between $-30°$ C. and $+70°$ C.

149. A glass substrate as claimed in claim 80, wherein the average linear thermal expansion coefficient falls within a range between $105\times10^{-7}$/K and $120\times10^{-7}$/K. in a temperature range between $-30°$ C. and $+70°$ C.

150. A glass substrate as claimed in claim 81, wherein the average linear thermal expansion coefficient falls within a range between $105\times10^{-7}$/K and $120\times10^{-7}$/K. in a temperature range between $-30°$ C. and $+70°$ C.

151. A glass substrate as claimed in claim 21, wherein the average linear thermal expansion coefficient falls within a range between $105\times10^{-7}$/K and $120\times10^{-7}$/K. in a temperature range between $-30°$ C. and $+70°$ C.

152. A glass substrate as claimed in claim 23, wherein the average linear thermal expansion coefficient falls within a range between $105\times10^{-7}$/K and $120\times10^{-7}$/K. in a temperature range between $-30°$ C. and $+70°$ C.

153. An optical multiplexer/demultiplexer apparatus comprising:

the optical filter claimed in claim 16.

* * * * *

UNITED STATES PATENT AND TRADEMARK OFFICE
CERTIFICATE OF CORRECTION

PATENT NO. : 6,465,105 B1
DATED : October 15, 2002
INVENTOR(S) : Robert W. Johnson, Hiroaki Yanagita and Kazuaki Hashimoto It is certified that error appears in the above-identified patent and that said Letters Patent is hereby corrected as shown below:

<u>Title page,</u>
Item [73], Assignees, after "Hoya Corporation, Tokyo (JP);" please insert
-- Hoya Corporation USA, San Jose, CA (US) --

Signed and Sealed this

Eighteenth Day of March, 2003

JAMES E. ROGAN
*Director of the United States Patent and Trademark Office*